Patented Aug. 29, 1933

1,924,657

UNITED STATES PATENT OFFICE 1,924,657

PIPING

Leonard W. Saine, Jackson Heights, N. Y., and Anton Hansen, Newark, N. J., assignors to Central Foundry Company, New York, N. Y., a corporation of Maine Application October 13, 1930. Serial No. 488,229

3 Claims. (Cl. 285—134)

Our invention relates to improvements in piping, and more particularly has reference to and is illustrated in the accompanying drawings in its application to pipe connections, such as are commonly used for water, drainage, and other purposes for conveying fluids of various kinds. One of the principal objects of the invention is to provide a substantially hermetical pipe joint or connection between sections of pipe such as are usually buried under ground, and to allow for variations in alignment of the same.

Figure 1:
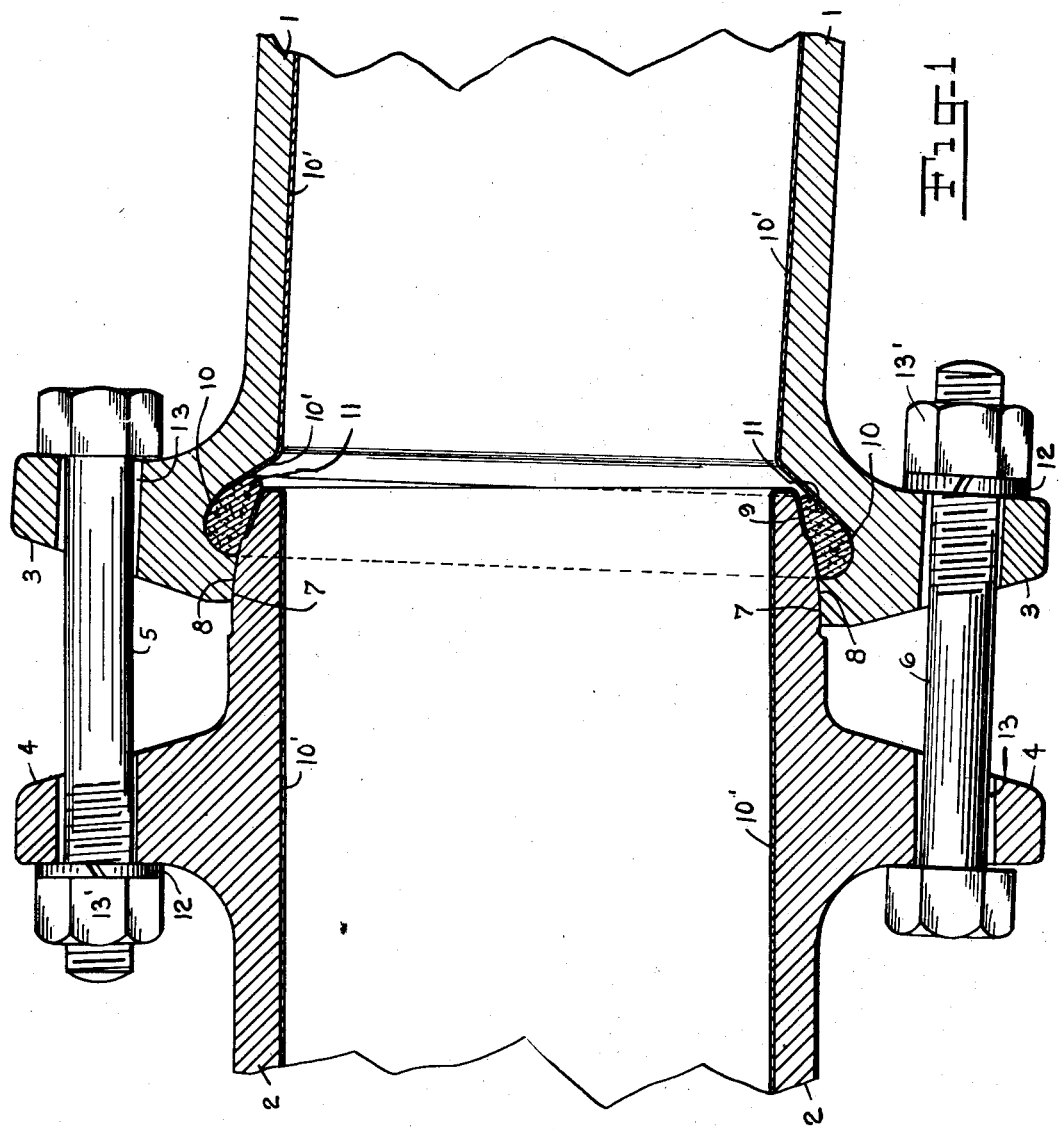
Figure 2:
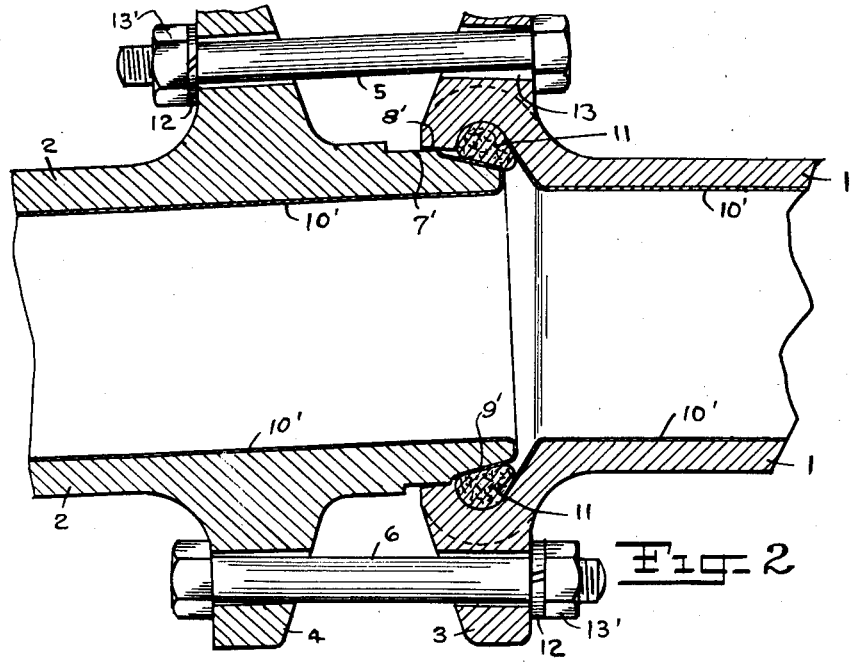
Figure 3:
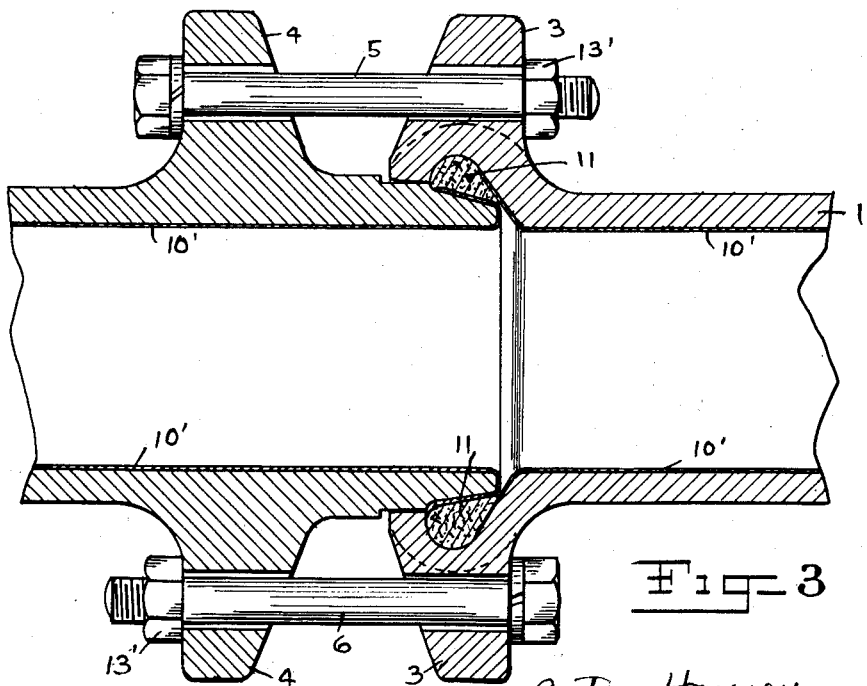

In the accompanying drawings, Fig. 1 is a longitudinal vertical sectional view of one form of the invention, and Figs. 2 and 3 are similar views of a modified form, with non-aligned and aligned pipe sections respectively.

In the drawings, reference numerals 1 and 2 indicate the adjoining ends of coupled pipe sections each of which are provided with lugs 3, 4, having holes 13, for the bolts 5, 6, said holes being preferably of slightly larger diameter than the bolts to prevent binding or pinching of the bolts therein when the sections of pipe are out of alignment.

The male end of the section 2 is adapted to enter the adjoining end of section 1 as shown, and is provided with a circumferential tapered face portion 7 varying only slightly from parallelism with the axis of the bore of the pipe section 2, and gradually reducing the thickness of the wall of that pipe section from its normal external diameter toward its free spigot end. The female end of the pipe section 1, adjacent its free end has an inner bearing face portion 8 of less diameter than the largest diameter of the face portion 7, and both of these face portions may be curved on a radius centering on the axis of the bore of the pipe section 1 at a point substantially in the plane of the free end of the pipe section 1. The slight pitch of the taper of face portions 7 and 8 permit the former to jam tightly into the face portion 8 when the pipe sections are forcibly drawn together under tremendous force exerted by the bolts 5 so that these faces 7 and 8 slide over each other with a self-lapping effect, and the curvature of these faces permits the pipe sections to be secured out of alignment with each other yet at the same time the face portions 7 and 8 still draw together with the self-lapping effect.

The extreme inner end of the male section is also tapered circumferentially, as indicated at 9. and at the inside adjacent the end of the female section is provided a circumferential channel 10 or other suitable recessed portion into which may be introduced a ring or gasket 11 of suitable composition, or rubber, the same being preferably resilient, elastic or plastic, and the insides of the sections may be coated or lined with cement, enamel, or other suitable noncorrosive material which also preferably extends over the taper 9 and inside the circumferential channel 10 as shown at 10'. The said recessed portion 10 provides a suitable retaining seat for said ring or gasket 11.

When the sections are laid, the rings or gaskets 11 are first applied, and after the end of a male section has been introduced into the end of the adjacent section, the bolts 5 and 6 are then applied and drawn up substantially tightly, thus allowing the sections to accommodate themselves to any slight unevenness or lack of alignment. And, of course, suitable lock washers, such as 12, may be employed beneath the nuts 13'.

It has been found that pipe connected in this manner provides a substantially continuous hermetically sealed duct, and even when some of the bolts are removed after liquid under-pressure has been allowed through the piping, the same remains intact without leakage, thus assuring a perfectly tight job, easily and quickly laid, and handleable with minimum breakage. Also, it will be readily observed that the ring 11 of suitable packing material will be compressed between the tapered surface 9 and the recessed portion or channel 10 proportionately with the pressure within said piping and substantially without tending to separate the sections of the same. In other words, the pressure within the piping tends to drive the ring 11 radially and down into the seat at the outer side of the channel 10, thereby proportionately compressing the same between the outer wall of said channel and the tapered wall 9 of the adjoining section. The modified form is the same substantially in principle to the main form, except that the face portion 7', while still slightly tapered is not curved and the face portion 8' is conical though having a greater pitch than the face portion 7'. The packing receiving seat 9' is substantially similar to that as in the main form. The internal diameter of the face portion 8' is of less diameter than the largest diameter of the face portion 7' and will have a self-lapping jamming fit therewith whether the pipes are forced together in alignment or out of alignment. Otherwise the two forms of the invention are the same.

Of course, it will be readily understood that various modifications may be made in the construction and arrangement of parts without departing from the spirit of the invention as claimed.

I claim:

1. In a device of the character described, a pipe section having a male end and a pipe section having a female end, the male end having a substantially smooth outer face portion tapering toward its free end and varying only slightly from parallelism with the axis of the bore of the male end, the female end being provided adjacent its free end with a substantially smooth inner face portion slidably telescoped with the tapering outer face portion of the male end and being of less diameter than the largest diameter of the last mentioned face portion, means for forcing the said face portions of the male and female ends together with a jamming fit, one of the pipe ends being provided with an annular recessed portion adjacent its jammed face portion, and packing seated against said recessed portion, the free end of the male end terminating short of a wall of the female end to expose the packing to the pressure of the fluid conveyed by the pipe sections.

2. In a device of the character described, a pipe section having a male end and a pipe section having a female end, the male end having a substantially smooth outer face portion tapering toward its free end and varying only slightly from parallelism with the axis of the bore of the male end, the female end being provided adjacent its free end with a substantially smooth inner face portion slidably telescoped with the tapering outer face portion of the male end and being of less diameter than the largest diameter of the last mentioned face portion, the said face portion of the male end being also curved on a radius centering on the axis of the male end substantially in the plane of the free end of the female end, means for forcing the said face portions of the male and female ends together with a jamming fit, the male end being provided with an annular interior groove adjacent its jammed face portion, the free end of the male end terminating short of the inner wall of the female end, and packing within the said groove and surrounding the free end portion of the male end and being exposed to the pressure of the fluid medium conveyed by the pipe sections.

3. In a device of the character described, a pipe section having a male end and a pipe section having a female end, the male end having a substantially smooth outer face portion tapering from the general outer diameter of the respective pipe section toward a free end of said pipe section, the pitch of the said tapering face portion varying only slightly from parallelism with the axis of the bore of the male end, the female end being provided adjacent its free end with a substantially smooth inner face slidably telescoped with the tapering outer face portion of the male end and being of less diameter than the largest diameter of the last mentioned face portion, the telescoped face portions of the male and female ends being also curved on a radius centering on the axis of the male end substantially in the plane of the free end of the female end, means for forcing the said face portions of the male and female ends together with a jamming fit, the female end being internally channeled adjacent its jammed face portion and having a shoulder spaced from the free end of the male end, the male end having a second tapering face portion between its other tapering face portion and on a greater angle, and packing surrounding said second tapering face portion of the male end and within the said channel and being in communication with the pressure of the fluid conveyed by the pipe sections.

LEONARD W. SAINE.
ANTON HANSEN.